(12) United States Patent
Jiang

(10) Patent No.: US 7,764,953 B2
(45) Date of Patent: Jul. 27, 2010

(54) METHOD, SYSTEM AND DEVICE FOR SPEECH CODEC NEGOTIATION IN COMMUNICATION SYSTEM

(75) Inventor: Li Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 762 days.

(21) Appl. No.: 11/787,527

(22) Filed: Apr. 17, 2007

(65) Prior Publication Data

US 2007/0242704 A1 Oct. 18, 2007

(30) Foreign Application Priority Data

Apr. 18, 2006 (CN) .................. 2006 1 0035050

(51) Int. Cl.
*H04L 29/08* (2006.01)
(52) U.S. Cl. .............. 455/414.4; 455/424; 455/425; 455/428
(58) Field of Classification Search ............ 455/536, 455/428, 422.1, 423, 424, 425, 445, 414.4, 455/418–429, 403
See application file for complete search history.

(56) References Cited

U.S. PATENT DOCUMENTS

| | | | |
|---|---|---|---|
| 6,373,839 B1 * | 4/2002 | Clark et al. | 370/352 |
| 7,031,703 B1 * | 4/2006 | Graf et al. | 455/432.1 |
| 2003/0169768 A1 * | 9/2003 | Bienn et al. | 370/469 |
| 2004/0203802 A1 | 10/2004 | McCormick et al. | |
| 2004/0258016 A1 * | 12/2004 | Schmidt et al. | 370/329 |
| 2006/0211425 A1 * | 9/2006 | Bae et al. | 455/445 |

FOREIGN PATENT DOCUMENTS

| | | |
|---|---|---|
| CN | 1501724 | 6/2004 |
| KR | 20050019344 | 3/2005 |
| WO | WO 01/08434 A1 | 2/2001 |

OTHER PUBLICATIONS

International Search Report from International Patent Application PCT/CN2006/003214.

(Continued)

*Primary Examiner*—Kamran Afshar
*Assistant Examiner*—Marisol Fahnert
(74) *Attorney, Agent, or Firm*—Conley Rose, P.C.; Grant Rodolph

(57) ABSTRACT

The embodiments of the present invention disclose a method for speech Codec negotiation in a communication system in which a calling user initiates the speech Codec negotiation with a called mobile station. The method includes: receiving by a mobile switching center emulation in the communication system an originating call signal from a calling user, the originating call signal carrying a number of a called mobile station; obtaining a latest speech Codec list used by the called mobile station from a database storing mobile station information in accordance with the number of the called mobile station; determining a speech Codec to be used in a communication between the calling user and the called mobile station; and establishing a voice bearer in the speech Codec for the calling user and the called mobile station. The method avoids a bearer update process and improves switching speed. In addition, the embodiments of the present invention also disclose a system and a device for speech Codec negotiation in a communication system.

12 Claims, 5 Drawing Sheets

OTHER PUBLICATIONS

European Search Report from European Patent Application 07007802.

Foreign Communication from a counterpart application—PCT/CN2006/003214; English Translation of International Preliminary Report on Patentability; Oct. 21, 2008; 4 pages.

Foreign Communication from a counterpart application—Chinese application 2006100350509, Office Action dated Sep. 4, 2009; 5 pages.

Foreign Communication from a counterpart application—Chinese application 2006100350509, English Translation of Office Action dated Sep. 4, 2009; 4 pages.

Foreign Communication from a counterpart application—EP application 07007802.7, Office Action dated Dec. 14, 2007, 2 pages.

Foreign Communication from a counterpart application—EP application 07007802.7, Office Action dated Jul. 28, 2009, 2 pages Foreign Communication from a counterpart application—EP application 07007802.7, Office Action dated Mar. 23, 2010, 2 pages.

* cited by examiner

METHOD, SYSTEM AND DEVICE FOR SPEECH CODEC NEGOTIATION IN COMMUNICATION SYSTEM

This application claims priority to Chinese Application No. 200610035050.9, filed on Apr. 18, 2006 and entitled "Method and System for Speech Codec Negotiation in Communication System", contents of which are incorporated herein by reference in its entirety.

FIELD OF THE INVENTION

The present invention relates to communication technologies, and particularly, to a method, system and device for speech Codec negotiation in communication system.

BACKGROUND OF THE INVENTION

Mobile communication systems with Code Division Multiple Access (CDMA) modulation technique may adopt soft switch architecture and IP bearer for voice data transmission.

In the soft switch architecture, the two communication parties have to negotiate for speech Codec during a call setup process. The negotiation process in the prior art can include the following steps.

1. A calling user initiates a call request and transfers to a called user a Codec list CodecListA (Codec 1, Codec 2, Codec 3, . . . ) supported by the calling user as well as a Codec preferred by the calling user, e.g., Codec 1;

2. When receiving the Codec list CodecListA from the calling user, the called user finds a speech Codec supported by itself from the Codec list, and assigns that Codec as to be used by the calling user. When the called user chooses the Codec to be used by itself, it will consider the Codec preferred by the calling user in precedence, e.g., the Codec 1.

The choice of the called user has the following three cases.

A. If the called user chooses to use the Codec, e.g., Codec 1, preferred by the calling user, that is, the Codec used by the called user is consistent with that used by the calling user, there is no need to use a speech transcoder on the speech channel from the calling user to the called user, which is an ideal case.

B. If the called user doesn't choose the Codec preferred by the calling user, in other words, the called user doesn't support the speech Codec preferred by the calling user, e.g., the Codec 1, but chooses a non-preferred Codec, e.g., Codec 2, in the CodecListA supported by the calling user, a mobile switching system in the communication system will initiate a change process to the calling user, to instruct the calling user to change the Codec to Codec 2. In that case, the Codecs used by the calling user and the called user are consistent, and thereby there is no need to use a speech transcoder on the speech channel from the calling user to the called user. However, compared to case A, a Codec change process for the calling user is added.

C. If the called user doesn't choose any Codec from the CodecListA supported by the calling user, e.g., the called user chooses Codec 9, which is not in the CodecListA supported by the calling user, the communication system will insert a speech transcoder between the calling user and the called user, to implement conversion of voice streams in different Codecs between the calling user and the called user.

It may be seen that the negotiation is mainly accomplished by the calling user, the called user and the mobile switching system (e.g., Mobile Switching Center emulation (MSCe)) in the communication system. In above case B, the process in the prior art includes at least the following steps.

1. The calling user initiates a call request. The speech Codec list, e.g., CodecListA, supported by the calling user is carried in a signal to an MSCe triggered by the call request, and the preferred Codec (e.g., Codec 1) is assigned in the speech Codec list, in order to indicate that the calling user expects to use the preferred Codec to establish a bearer.

2. When the MSCe receives the signal, it uses the preferred Codec (i.e., Codec 1) to establish the bearer through the following steps: the MSCe sends a request for setting up a calling bearer endpoint to the Media GateWay (MGW); when receiving that request, the MGW sets up the calling bearer endpoint with Codec 1 and then returns setup success information to the MSCe.

3. The MSCe initiates a paging to the called user.

4. The called user transmits a paging response signal to the MSCe. A speech Codec list supported by the called user (e.g., CodecListB) is carried in the paging response signal and a preferred Codec (e.g., Codec 2) is assigned in the speech Codec list, to indicate that the called user expects to use the preferred Codec to set up the bearer.

5. The MSCe determines that there is an intersection set between CodecListA and CodecListB and the intersection set doesn't contain Codec 1 but contains Codec 2 (or another Codec supported by both the calling user and the called user), then sends a bearer update request to the calling user to request the calling user to change the preferred Codec of the calling user to Codec 2 (or another Codec supported by both the calling user and the called user); when receiving a response from the calling user, the MSCe updates the calling bearer endpoint that is set up in Step 2, and sets up a called bearer endpoint (in a similar process as the calling bearer endpoint setup process in Step 2).

It may be seen from above negotiation steps that, in the case that there is a Codec list supported by both the calling user and the called user (i.e., the intersection set between above CodecListA and CodecListB) while the preferred Codec of the calling party isn't in that list, the bearer update process is needed, which increases system cost and connecting duration.

SUMMARY OF THE INVENTION

The embodiments of the present invention is to provide a method, system and device for speech Codec negotiation in communication system, so as to reduce system cost and improve connection speed.

In one aspect of the embodiments of the present invention, there is provided a method for speech Codec negotiation in a communication system. According to an embodiment of present invention, the method may include: receiving by a mobile switching center emulation in the communication system, an originating call signal from a calling user, the originating call signal carrying a number of a called mobile station; obtaining a latest speech Codec list used by the called mobile station from a database storing mobile station information in accordance with the number of the called mobile station; obtaining by the mobile switching center emulation a speech Codec list supported by the calling user; and determining a speech Codec to be used in a communication between the calling user and the called mobile station, in accordance with the speech Codec list supported by the calling user and the latest speech Codec list used by the called mobile station.

In another aspect of the embodiments of the present invention, there is provided a system for speech Codec negotiation in a communication system. According to an embodiment of the present invention, the system may include:

a calling user device and a called mobile station;

a database, adapted to store information of speech Codecs supported by users; and a mobile switching center emulation, adapted to determine a speech Codec to be used in a communication between the calling user device and the called mobile station in accordance with the information stored in the database.

According to a further aspect of the embodiments of the present invention, there is provided a device for speech Codec negotiation in a communication system. According to an embodiment of the present invention, the device may include:

a transceiver, adapted to perform message interactions with other devices in the communication system, the message interactions comprising receiving an originating call signal from a calling user and receiving a response signal from a called mobile station, and the originating call signal carrying a number of the called mobile station;

a mobile station information obtaining means, adapted to obtain information of a mobile station involved in a voice communication in accordance with information received by the transceiver, the obtained information comprising a speech Codec list supported by the mobile station;

a database coupled to the mobile station information obtaining means, adapted to store the information of the mobile station obtained by the mobile station information obtaining means; and a service negotiator coupled to the transceiver and the database respectively, adapted to obtain a latest speech Codec list used by the called mobile station from the database in accordance with the originating call signal, obtain a speech Codec list supported by the calling user in accordance with the originating call signal received by the transceiver, and determine a speech Codec to be used in a communication between the calling user and the called mobile station.

Due to the fact that in the embodiments of the present invention, the speech Codec information of the calling user and/or the called mobile station may be stored in the database storing the mobile station information, in the subsequent call process, the mobile switching center emulation can obtain the latest speech Codec information of the called mobile station through communicating with the database and then determine in advance the speech Codec to be used for the call. Therefore, the bearer update process may be omitted, and the system cost and connecting duration may be reduced.

DETAILED DESCRIPTION OF THE EMBODIMENTS

According to the embodiments of the present invention, when any mobile station carries out a voice communication, a speech Codec list supported by the mobile station is recorded and the recorded information is stored into a database. In that way, when a calling user initiates a call, the mobile switching center emulation can obtain a latest speech Codec list used by a called mobile station from the database in accordance with the number of the called mobile station carried in a call signal; then, the mobile switching center emulation can determine a speech Codec to be used by the calling user and the called mobile station in a communication between them in accordance with a speech Codec list supported by the calling user and the latest speech Codec list used by the called mobile station, and set up a voice bearer in that speech Codec between the calling user and the called mobile station.

Figure 1:
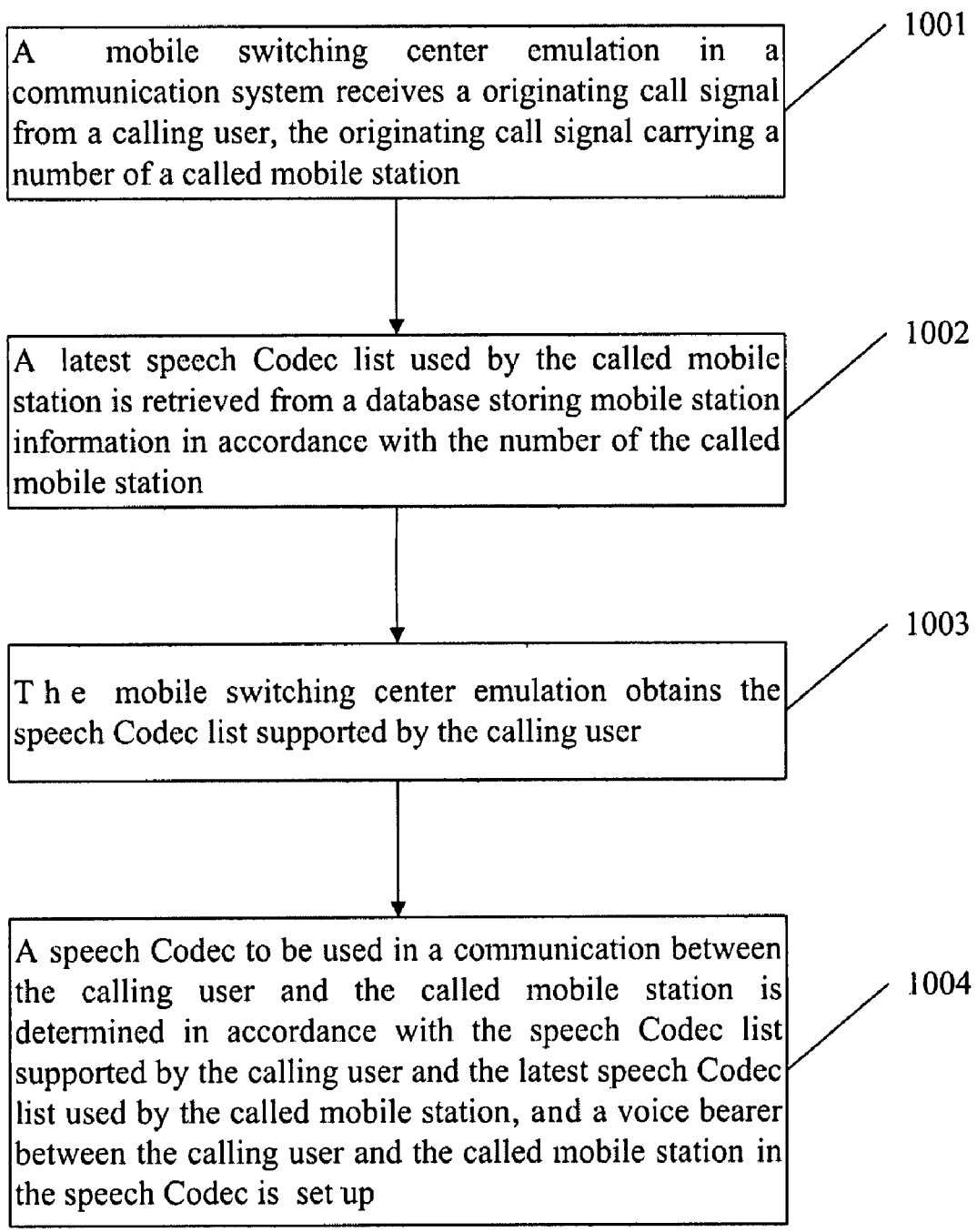
FIG. 1 is an implementing flow chart of a method according to an embodiment of the present invention.

FIG. 1 illustrates an implementing flow chart of a method according to an embodiment of the present invention. The method includes the following steps.

In Step 1001, a mobile switching center emulation in a communication system receives an originating call signal from a calling user, the originating call signal carrying a number of a called mobile station.

The calling user may be a mobile station or a fixed telephone.

In Step 1002, a latest speech Codec list used by the called mobile station is obtained from a database storing mobile station information in accordance with the number of the called mobile station.

The database storing mobile station information can be a Visit Location Register (VLR). When any mobile station (as a calling party or a called party) carries out a voice communication, the speech Codec list supported by the mobile station can be stored in the database. In that way, each mobile station number can be mapped to one or more speech Codec lists; therefore, the latest speech Codec list used by the called mobile station can be chosen. Practically other speech Codec lists corresponding to a mobile station number can be overwritten when a new speech Codec list corresponding to the same number is saved. That is to say, in the database, only a latest speech Codec list used by the mobile station is stored.

In addition, a speech Codec preferred by the mobile station can be stored in the database.

The mobile switching center emulation transmits a request signal to the VLR, with the number of the called mobile station carried in the request signal. After receiving the request signal, the VLR sends the latest speech Codec list used by the called mobile station to the mobile switching center emulation. The mobile switching center emulation can carry out a message interaction with the VLR via a Home Location Register (HLR), for example, through an LOCREQ, ROUTREQ, routreq, or locreq message interaction, to obtain the latest speech Codec list used by the called mobile station.

In Step 1003, the mobile switching center emulation obtains the speech Codec list supported by the calling user.

A call request message sent by the calling user carries the speech Codec preferred by the calling user and the speech Codec list supported by the calling user. Therefore, a base station to which the calling user pertains can carry the speech Codec list supported by the calling user in the originating call signal when forwarding this originating call signal to the mobile switching center emulation. In that way, the mobile switching center emulation can directly obtain the speech Codec list supported by the calling user from the originating call signal. Optionally, the mobile switching center emulation can interact with the base station to which the calling user pertains to obtain the speech Codec list supported by the calling user.

In Step 1004, a speech Codec to be used in the communication between the calling user and the called mobile station is determined in accordance with the speech Codec list supported by the calling user and the latest speech Codec list used by the called mobile station.

In determining the speech Codec to be used in the communication between the calling user and the called mobile station, a speech Codec in an intersection set between the latest speech Codec list used by the called mobile station and the speech Codec list supported by the calling user can be chosen as the speech Codec to be used in the communication between the calling user and the called mobile station. Practically, if there is a speech Codec preferred by the calling user or the called mobile station in the intersection set, the speech Codec can be chosen in precedence.

In that way, the calling user and the called mobile station can set up a voice bearer between them in the speech Codec.

The process of setting up the bearer to the calling mobile station can be carried out before paging the called mobile station or during paging the called mobile station.

Figure 2:
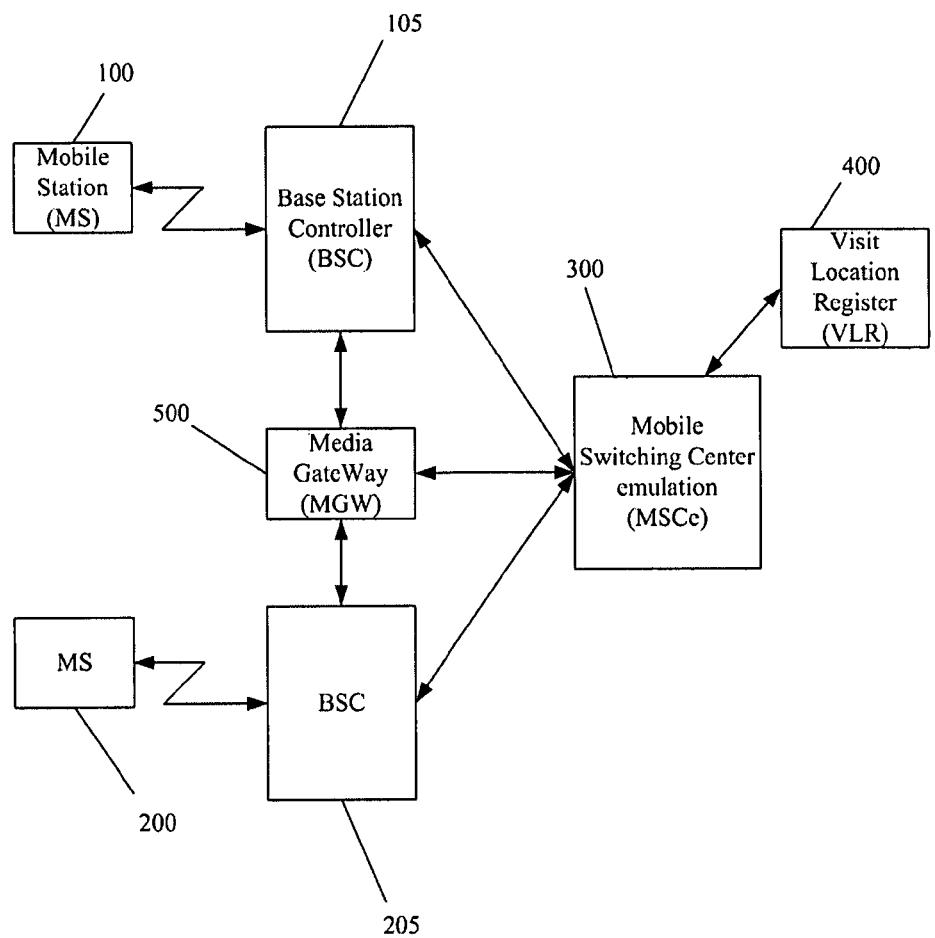
FIG. 2 is a network structure diagram of a system according to an embodiment of the present invention.

FIG. 2 illustrates a network structure diagram of a system according to an embodiment of the present invention.

As shown in FIG. 2, a mobile station (MS) 100 and an MS 200 are two mobile stations. For the convenience of differentiation, the MS 100 is referred to as a first communication unit, and the MS 200 is referred to as a second communication unit. When the MS 100 originates a call request to the MS 200, the MS 100 is a calling user, while MS 200 is a called user.

A speech Codec negotiation and a subsequent communication between the MS 100 and the MS 200 are implemented through a communication network (not labeled in FIG. 2). The communication network includes an access network (not labeled in FIG. 2) and a core network (not labeled in FIG. 2). As shown in FIG. 2, the access network includes a base station controller (BSC) 105 and a BSC 205. The BSC 105 is an access network equipment for the calling user MS 100, while the BSC 205 is an access network equipment for the called user MS 200. The MS 100 is coupled to the BSC 105, while the MS 200 is coupled to the BSC 205. Practically the access network can further include other devices such as a base station transceiver (BTS); however, those devices and their signal transmission are techniques familiar to those skilled in the art, and thereby will not be described further here.

The BSC 105 and the BSC 205 are coupled to a Mobile Switching Center emulation (MSCe) 300. The MSCe 300 is coupled to other devices, such as a Visit Location Register (VLR) 400 and a Media GateWay (MGW) 500. The BSC 105 and the BSC 205 are coupled to the MGW 500 respectively. After the MS 100 and the MS 200 negotiate a speech Codec, the two communication parties will communicate with each other through a voice channel provided by the MGW 500. Practically, the devices can include other devices; however, those devices are not the emphasis of the present invention, and will not be described further here.

It is noted that the above network element devices can be in singular form or plural form in quantity.

Figure 3:
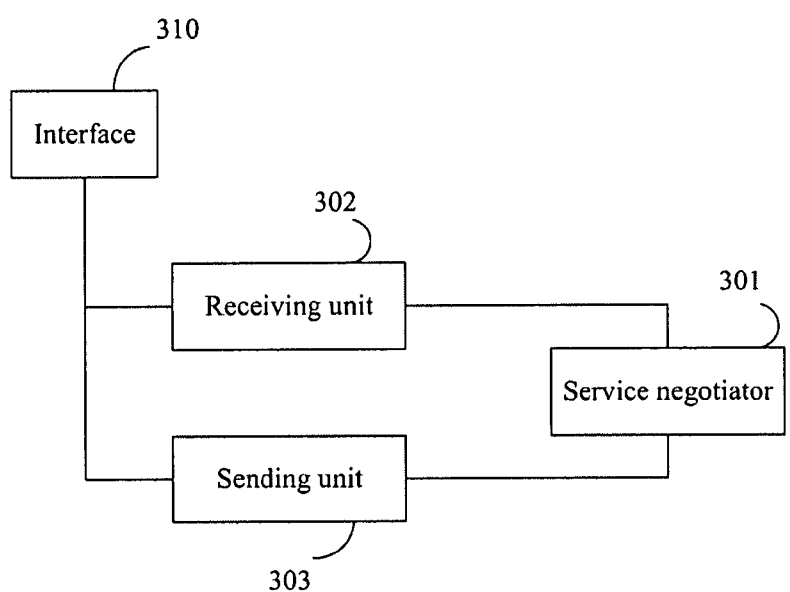
FIG. 3 is a structure diagram of the mobile switching center emulation shown in FIG. 2 according to an embodiment of the present invention.

FIG. 3 illustrates a structure diagram of the mobile switching center emulation shown in FIG. 2 according to an embodiment of the present invention. In this embodiment, the mobile switching center emulation includes: a sending means 303, a receiving means 302 and a service negotiator 301. The sending means 303 and the receiving means 302 are coupled to the service negotiator 301 respectively. The sending means 303 and the receiving means 302 are coupled to an interface 310 respectively to send or receive messages via the interface 310.

Figure 4:
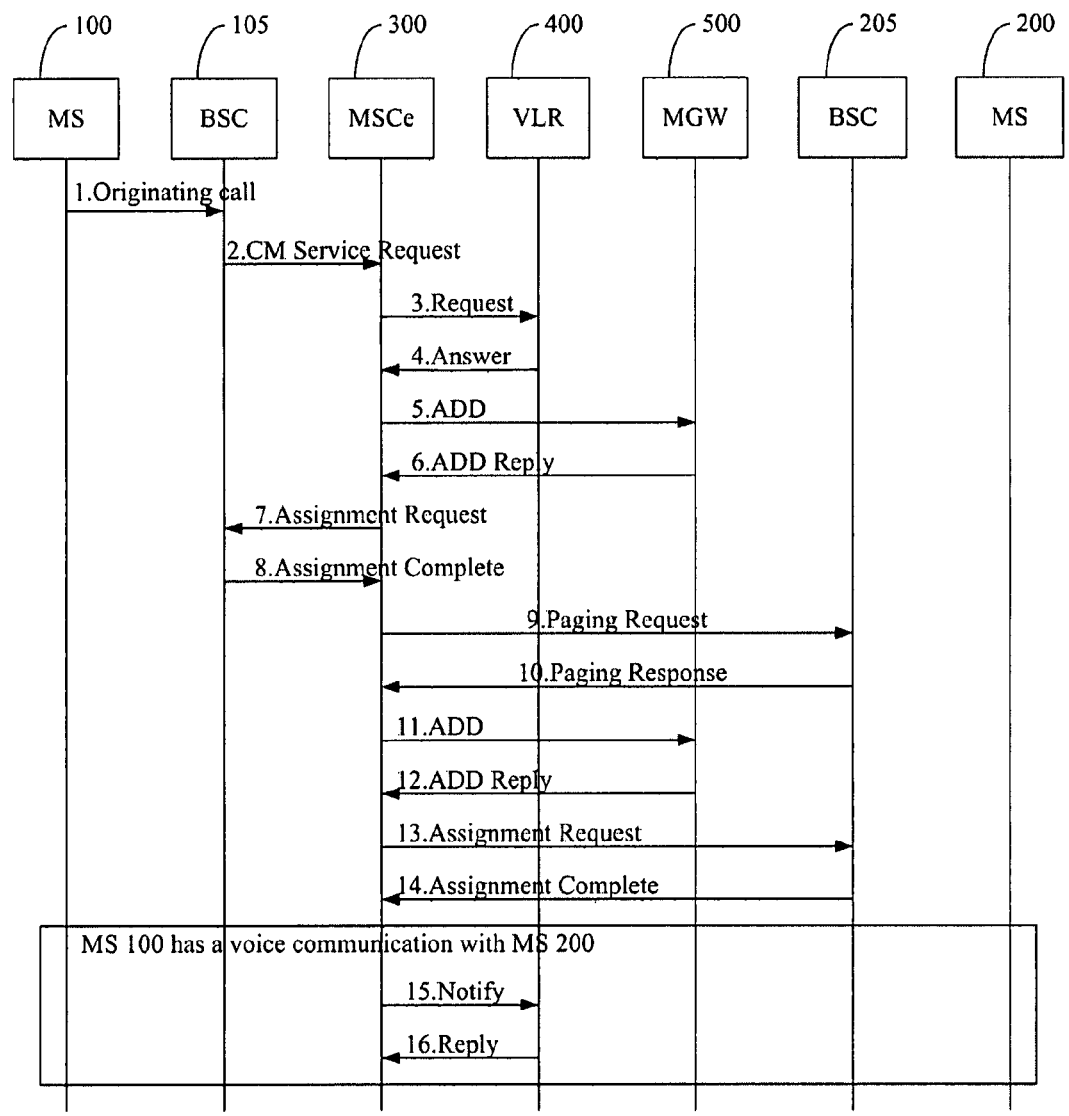
FIG. 4 is a flow chart of message interaction for a speech Codec negotiation based on the communication system shown in FIG. 2, according to an embodiment of the present invention.

FIG. 4 illustrates a flow chart of message interaction for a speech Codec negotiation based on the communication system shown in FIG. 2, according to an embodiment of the present invention. As shown in FIG. 4, the message interaction process includes the following steps.

1. The MS 100 transmits an originating call signal to originate the speech Codec negotiation with the MS 200. The originating call signal contains a number of the called user MS 200.

2. The BSC 105 receives the originating call signal, treats the signal and sends the signal as a CM Service Request. When treating that signal, the BSC 105 can carry a speech Codec list, e.g., CodecListA which includes (Codec 1, Codec 2, Codec 3 and Codec 4), supported by the MS 100 in the message, and assign a preferred Codec as Codec 1, indicating that the calling user expects to use Codec 1 to set up a bearer connection. Practically the speech Codec list supported by the MS 100 may not be carried, in other words, the BSC 105 is in charge of forwarding the originating call signal and has the right to treat the originating call signal.

3. The MSCe 300 receives the CM Service Request via the interface 310 and the receiving means 302, and generates a request signal by the service negotiator 301, which signal carries a number of the MS 200 (obtained from the CM Service Request) and indicates a request for obtaining a latest speech Codec list used by the MS 200. The request signal (the Request in FIG. 4) is sent by the sending means 303 via the interface 310.

4. The VLR 400 receives the request signal and finds the latest speech Codec list, e.g., CodecListB which includes Codec 2, Codec 3, Codec 4 and Codec 5, used by the MS 200, and generates a response signal (the Answer in FIG. 4), with the list (CodecListB) carried in the response signal. The response signal is sent.

The MSCe 300 receives the response signal via the interface 310 and the receiving means 302. The service negotiator 301 chooses a preferred Codec for communication between the MS 100 and the MS 200 from an intersection set between CodecListA contained in the originating call signal and CodecListB contained in the response signal. CodecListA is (Codec 1, Codec 2, Codec 3, Codec 4), CodecListB is (Codec 2, Codec 3, Codec 4, Codec 5), and the intersection set of CodecListA and CodecListB is (Codec 2, Codec 3, Codec 4), while the preferred Codec, i.e., Codec 1, preferred by the MS 100 is not in the intersection set, therefore the MSCe 300 can choose Codec 2 in the intersection set (practically, it can also choose Codec 3 or Codec 4). MSCe 300 establishes the bearer through the following Steps 5, 6, 7, 8, 9, 10, 11 and 12.

5. The MSCe 300 sends an ADD message to the MGW 500 via the sending means 303 and the interface 310 to request the MGW 500 to establish a voice bearer endpoint for the MS 100. In the ADD message, a speech Codec for the voice bearer endpoint is assigned as Codec 2 chosen by the MSCe 300.

6. After establishing the voice bearer endpoint for the MS 100, the MGW 500 sends an ADD Reply message to the MSCe 300, to indicate that the bearer endpoint is established successfully.

7. When receiving the ADD Reply message, the MSCe 300 sends an Assignment Request message via the sending means 303 and the interface 310 to the BSC 105, with the speech Codec 2 assigned by the MSCe 300 for the MS 100 carried in the Assignment Request message.

8. The BSC 105 returns an Assignment Complete message to the MSCe 300, to indicate the assignment is successful.

9. The MSCe 300 sends a Paging Request to the BSC 205.

10. The BSC 205 sends a Paging Response to the MSCe 300, to indicate the paging is successful.

11. The MSCe 300 sends an ADD message to the MGW 500 via the sending means 303 and the interface 310 to request the MGW 500 to establish a voice bearer endpoint for the MS 200. In the ADD message, a speech Codec for the voice bearer endpoint is assigned as Codec 2 chosen by the MSCe 300.

12. After establishing the voice bearer endpoint for the MS 200, the MGW 500 sends an ADD Reply message to the MSCe 300, to indicate that the bearer endpoint is established successfully.

13. When receiving the ADD Reply message, the MSCe 300 sends an Assignment Request message to the BSC 205 via the sending means 303 and the interface 310, with the speech Codec 2 assigned by the MSCe 300 for the MS 200 carried in the Assignment Request message.

14. The BSC 205 returns an Assignment Complete message to the MSCe 300, to indicate that the assignment is successful.

It is noted that Steps 11, 12 and 13, 14 can be executed in parallel or in an alternative sequence. That is to say, the establishment of the called endpoint and the assignment request response steps can be executed in parallel or in any sequence.

In another embodiment of the present invention, the CM Service Request message in Step 2 doesn't carry the speech Codec list supported by the MS 100; instead, in Steps 7 and 8, the MSCe 300 requests the MS 100 to send the speech Codec list supported by the MS 100 through the Assignment Request message, and the MS 100 returns the speech Codec list through the Assignment Complete message. In that case, the process of choosing the preferred Codec in Step 4 and the process of assigning the voice bearer end for the MS 100 in Steps 5 and 6 have to be moved to behind Steps 7 and 8. That is to say, Steps 5, 6, 7, 8, 9, 10, 11 and 12 are the processes for MSCe 300 to determine the speech Codec for the MS 100 and MS 200. The interaction can be performed in a variety of forms.

Now, the negotiation is completed successfully, and the MS 100 and the MS 200 enter into a communication state. During the communication between the MS 100 and the MS 200, the MSCe 300 can transfer the speech Codec list(s) supported by the MS 100 and/or MS 200 to the VLR 400. The VLR 400 will store the speech Codec list(s) for use in the next negotiation. The process includes Steps 15 and 16.

15. The MSCe 300 sends a transmission signal (e.g., the NOTIFY message shown in the drawing), which carries CodecListA and/or CodecListB, to the VLR 400 via the sending means 303 and the interface 310.

16. When receiving the transmission signal, the VLR 400 stores CodecListA and/or CodecListB carried in the transmission signal, and sends a response signal (e.g., the REPLY message shown in the drawing) to the MSCe 300, indicating the storage is successful.

It is noted that the Steps 15 and 16 can be executed once the MSCe 300 receives the request from the MS 100; in that case, only CodecListA of the MS 100 is stored.

It can be seen from above description in the method and system provided in the embodiments of the present invention, by storing a latest speech Codec list used by a mobile station in the VLR 400 or any other mobile station information storage devices, when the mobile station carries on a speech Codec negotiation with a calling mobile station, the mobile switching center emulation may search in the VLR 400 or any other mobile station information storage devices and obtain a speech Codec used by the mobile station, and determine the speech Codec to be used in the communication between the calling mobile station and the called mobile station in advance; therefore, the change process for the calling user can be omitted, and the system cost and the connecting duration can be reduced.

Figure 5:
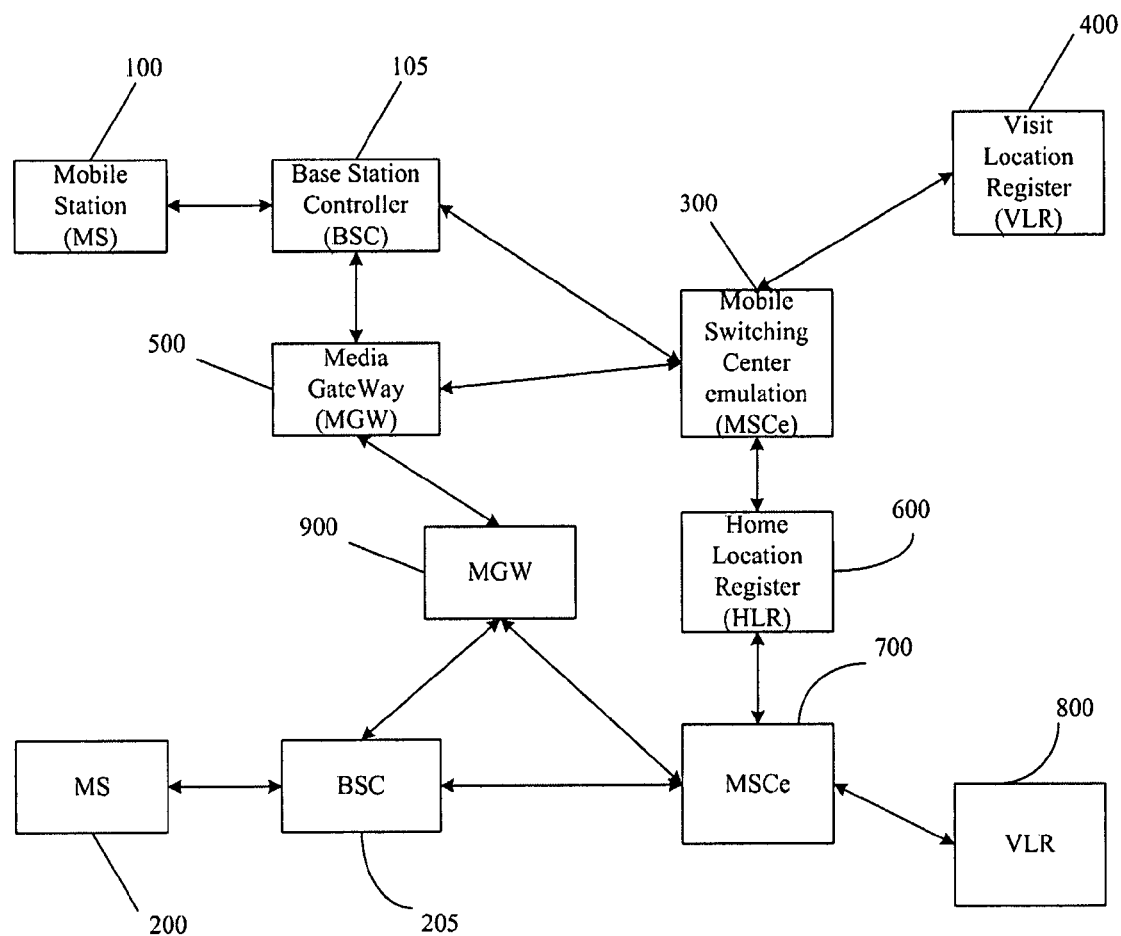
FIG. 5 is a network structure diagram of a system according to an embodiment of the present invention.

FIG. 5 illustrates a network structure diagram of a system according to another embodiment of the present invention.

With comparison between FIG. 2 and FIG. 5, an MS 100 and an MS 200 are in different offices, when compared to FIG. 2, that is, a call from the MS 100 to the MS 200 is a cross-office call. In that case, a mobile switching center emulation and a visit location register serving the MS 100 are an MSCe 300 and a VLR 400 respectively, and a media gateway serving the MS 100 is an MGW 500; a mobile switching center emulation and a visit location register serving the MS 200 are an MSCe 700 and a VLR 800 respectively, and a media gateway serving the MS 200 is an MGW 900. MGW 500 and the MGW 900 are connected to each other. When the MS 100 initiates an originating call to negotiate speech Codec with the MS 200, the MSCe 300 has to obtain a latest speech Codec list used by the MS 200 from the VLR 800 where the latest speech Codec list used by the MS 200 is stored. Therefore, the MSCe 300 has to access the MSCe 700 and then the VLR 800 via a Home Location Register (HLR) 600.

In the case of a cross-office call, there are LOCREQ, ROUTREQ, routreq, and locreq message interaction processes between the MSCe/VLR for the calling user and the MSCe/VLR for the called user, and the speech Codec list used by the called mobile station can be returned to the MSCe/VLR for the calling user in a routreq->locreq message.

Figure 6:
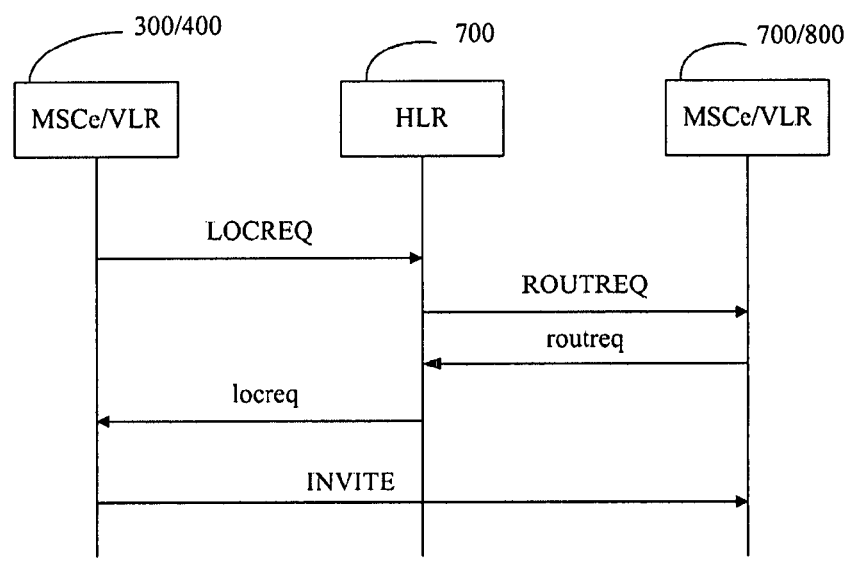
FIG. 6 is a flow chart of message interaction for a speech Codec negotiation based on the communication system shown in FIG. 5, according to an embodiment of the present invention.

In this embodiment, FIG. 6 illustrates a message interaction process through which an MSCe/VLR for a calling user obtains a speech Codec list used by a called user from an MSCe/VLR for the called user in the case of a cross-office call, in a method for speech Codec negotiation based on the communication system shown in FIG. 5.

With reference to FIG. 4, the message interaction process shown in FIG. 6 accomplishes the task in Steps 3 and 4 shown in FIG. 4. Other messages are identical to those shown in FIG. 4, and will not be described further here.

With reference to FIG. 6 and FIG. 5, when the calling user MS 100 initiates an originating call, the MSCe 300/VLR 400 at the calling user side will obtain the speech Codec list used by the called mobile station MS 200 via the HLR 600. The messages include: an LOCREQ message sent by the MSCe 300/VLR 400 to the HLR 600, a ROUTREQ message sent by the HLR 600 to the MSCe 700/VLR 800, a routreq message sent by the MSCe 700/VLR 800 to the HLR 600 which indicates a response to the request, a locreq message sent by the HLR 600 to the MSCe 300/VLR 400 which indicates a response and carries the latest speech Codec list used by the MS 200.

In the above system embodiment of the present invention, the case is described that the calling user device is a mobile station. In the case that the calling user device is a fixed telephone, that is, a fixed telephone user calls a mobile user, the embodiment is also applicable, and therefore will not described further here.

Figure 7:
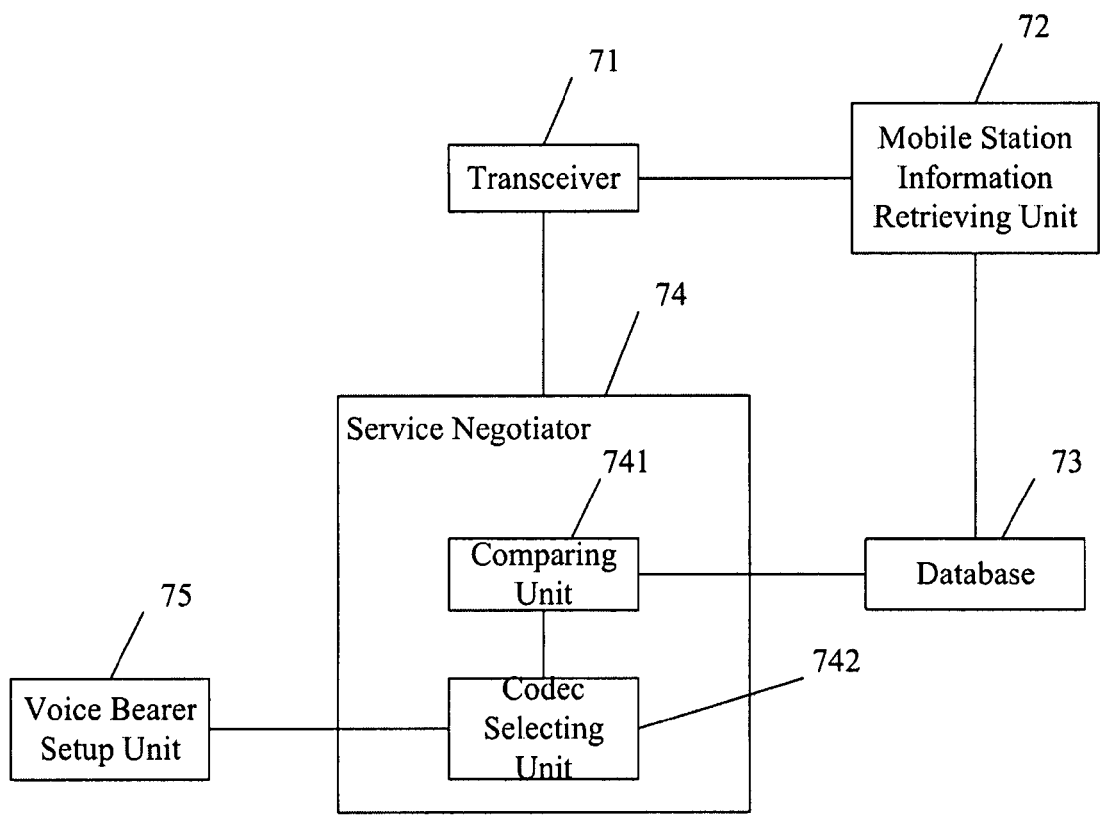
FIG. 7 is a principle block diagram of a device for speech Codec negotiation in a communication system according to an embodiment of the present invention.

FIG. 7 illustrates a principle block diagram of a device for speech Codec negotiation in a communication system according to an embodiment of the present invention.

In this embodiment, the device provided in the present invention includes: a transceiver 71, a mobile station information obtaining means 72, a database 73 and a service negotiator 74.

The transceiver 71 performs message interactions with other devices in the communication system, including receiving an originating call signal from a calling user and a response signal from a called mobile station; the originating call signal carries a number of the called mobile station. The mobile station information obtaining means 72 is adapted to obtain information of a mobile station involved in a voice communication in accordance with a message received by the transceiver; the information includes a speech Codec list supported by the mobile station. The database 73 is coupled to the mobile station information obtaining means 72 and the service negotiator 74, and adapted to store the mobile station information obtained by the mobile station information obtaining means. The service negotiator 74 is adapted to obtain a latest speech Codec list used by the called mobile station from the database 73 in accordance with the originating call signal and obtain a speech Codec list supported by the calling user in accordance with the originating call signal received by the transceiver, and then determine a speech Codec to be used in a communication between the calling user and the called mobile station.

As shown in FIG. 7, according to an embodiment of the present invention, the service negotiator 74 includes: a comparing unit 741 and a Codec selecting unit 742. The comparing unit 741 is adapted to obtain the speech Codecs in an intersection set between the latest speech Codec list used by the called mobile station and the speech Codec list supported by the calling user. The Codec selecting unit 742 is adapted to choose the speech Codec to be used in the communication between the calling user and the called mobile station from the intersection set; if the intersection set contains a speech Codec preferred by the calling user or the called mobile station, the Codec selecting unit 742 will choose that Codec in precedence. Practically, the service negotiator can also be implemented in other approaches.

In order to provide a voice bearer service to the mobile station, a voice bearer setup means 75, which is coupled to the service negotiator, can be added into the device. When the service negotiator determines the speech Codec to be used by the calling user and the called mobile station, the voice bearer setup means 75 will set up the voice bearer in that Codec for the calling user and the called mobile station. It can be seen that, by utilizing the present invention, in the case that there is an intersection set between the speech Codec list supported by the calling user and the speech Codec list supported by the called mobile station, the process for speech Codec negotiation between the calling user and the called user can be avoided, even if the speech Codec preferred by the calling user is not in the speech Codec list supported by the called mobile station; consequently, the system cost can be reduced, and the connecting duration can be shortened.

While the present invention has been illustrated and described with reference to some preferred embodiments, the present invention is not limited to these. Any equivalent variation without departing from the spirit and scope of the present invention shall fall into the protected domain of the present invention.

What is claimed is:

1. A method for speech Codec negotiation in a communication system, comprising:

receiving, by a mobile switching center emulation in the communication system, an originating call signal from a calling user, the originating call signal carrying a number of a called mobile station;

obtaining a latest speech Codec list used by the called mobile station from a database storing mobile station information in accordance with the number of the called mobile station;

obtaining, by the mobile switching center emulation, a speech Codec list supported by the calling user; and determining a speech Codec to be used in a communication between the calling user and the called mobile station, in accordance with the speech Codec list supported by the calling user and the latest speech Codec list used by the called mobile station;

wherein obtaining the speech Codec list supported by the calling user comprises:

requesting, by the mobile switching center emulation, the calling user to send the speech Codec list supported by the calling user through an Assignment Request message;

receiving, by the mobile switching center emulation, the speech Codec list supported by the calling user returned by the calling user through an Assignment Complete message; and wherein when the called mobile station performs a voice communication, the speech Codec list used by the called mobile station is stored in the database, and only a latest speech Codec list used by the mobile station is stored;

wherein the step of determining a speech Codec to be used in a communication between the calling user and the called mobile station comprises:

obtaining speech Codecs in an intersection set between the latest speech Codec list used by the called mobile station and the speech Codec list supported by the calling user; and choosing the speech Codec to be used in the communication between the calling user and the called mobile station from the intersection set, wherein when the intersection set between the latest speech Codec list used by the called mobile station and the speech Codec list supported by the calling user contains a speech Codec preferred by the calling user or the called mobile station, the speech Codec is chosen in precedence.

2. The method according to claim 1, wherein the step of determining a speech Codec to be used in a communication between the calling user and the called mobile station comprises:

obtaining speech Codecs in an intersection set between the latest speech Codec list used by the called mobile station and the speech Codec list supported by the calling user; and choosing the speech Codec to be used in the communication between the calling user and the called mobile station from the intersection set.

3. The method according to claim 1, wherein when the calling user and the called mobile station communicate across offices, the step of obtaining a latest speech Codec list used by the called mobile station comprises:

obtaining the latest speech Codec list by the mobile switching center emulation through an information interaction with the database via a Home Location Register (HLR).

4. The method according to claim 1, wherein the Assignment Request message and the Assignment Complete message are interacted between the mobile switching center emulation and a base station to which the calling user pertains.

5. The method according to claim 1, further comprising:
overwriting the speech Codec lists corresponding to the called mobile station when a new latest speech Codec list used corresponding to the same called mobile station is stored in the database.

6. A system for Codec negotiation in a communication system, comprising:
a calling user device and a called mobile station;
a database, adapted to store information of speech Codecs supported by users, wherein when the called mobile station performs a voice communication, the speech Codec list used by the called mobile station is stored in the database, and only a latest speech Codec list used by the mobile station is stored; and
a mobile switching center emulation, adapted to request the calling user device to send the speech Codec list supported by the calling user device through an Assignment Request message, receive the speech Codec list supported by the calling user device returned by the calling user device through an Assignment Complete message, and determine a speech Codec to be used in a communication between the calling user device and the called mobile station in accordance with the speech Codec list used by called mobile station and stored in the database, and the speech Codec list supported by the calling user device;
wherein the step of determining a speech Codec to be used in a communication between the calling user and the called mobile station comprises:
obtaining speech Codecs in an intersection set between the latest speech Codec list used by the called mobile station and the speech Codec list supported by the calling user; and
choosing the speech Codec to be used in the communication between the calling user and the called mobile station from the intersection set,
wherein when the intersection set between the latest speech Codec list used by the called mobile station and the speech Codec list supported by the calling user contains a speech Codec preferred by the calling user or the called mobile station, the speech Codec is chosen in precedence.

7. The system according to claim 6, wherein the database adapted to store information of mobile stations is a Visit Location Register (VLR).

8. The system according to claim 6, further comprising a media gateway which is coupled to the mobile switching center emulation and adapted to provide for the calling user and the called mobile station a voice bearer in the speech Codec determined by the service negotiator.

9. A device for speech Codec negotiation in a communication system, comprising:
a transceiver, adapted to perform message interactions with other devices in the communication system, the message interactions comprising receiving an originating call signal from a calling user and receiving a response signal from a called mobile station, and the originating call signal carrying a number of the called mobile station;
a mobile station information obtaining means, adapted to obtain information of a mobile station involved in a voice communication in accordance with information received by the transceiver, the obtained information comprising a speech Codec list supported by a calling user and a latest speech Codec list used by the called mobile station;
a database coupled to the mobile station information obtaining means, adapted to store the information of the called mobile station obtained by the mobile station information obtaining means; and
a service negotiator coupled to the transceiver and the database respectively, adapted to determine a speech Codec to be used in a communication between the calling user and the called mobile station, in accordance with the speech Codec list supported by the calling user and the latest speech Codec list used by the called mobile station;
wherein the mobile station information obtaining means is further adapted to request a calling user to send the speech Codec list supported by the calling user through an Assignment Request message, and receive the speech Codec list supported by the calling user that is returned by the calling user through an Assignment Complete message; and
wherein when the called mobile station performs a voice communication, the speech Codec list used by the called mobile station is stored in the database, and only a latest speech Codec list used by the mobile station is stored;
wherein the step of determining a speech Codec to be used in a communication between the calling user and the called mobile station comprises:
obtaining speech Codecs in an intersection set between the latest speech Codec list used by the called mobile station and the speech Codec list supported by the calling user; and
choosing the speech Codec to be used in the communication between the calling user and the called mobile station from the intersection set,
wherein when the intersection set between the latest speech Codec list used by the called mobile station and the speech Codec list supported by the calling user contains a speech Codec preferred by the calling user or the called mobile station, the speech Codec is chosen in precedence.

10. The device according to claim 9, wherein the service negotiator comprises:
a comparing unit, adapted to obtain speech Codecs in an intersection set between the latest speech Codec list used by the called mobile station and the speech Codec list supported by the calling user; and
a Codec selecting unit, adapted to choose from the intersection set the speech Codec to be used in the communication between the calling user and the called mobile station; wherein when the intersection set contains a speech Codec preferred by the calling user or the called mobile station, the Codec selecting unit chooses that speech Codec in precedence.

11. The device according to claim 10, wherein the device further comprises:
a voice bearer setup means coupled to the service negotiator, adapted to set up for the calling user and the called mobile station a voice bearer in the speech Codec determined by the service negotiator.

12. The device according to claim 9, wherein the device further comprises:
a voice bearer setup means coupled to the service negotiator, adapted to set up for the calling user and the called mobile station a voice bearer in the speech Codec determined by the service negotiator.

* * * * *